United States Patent [19]

Mehrotra et al.

[11] Patent Number: 5,059,564
[45] Date of Patent: Oct. 22, 1991

[54] ALUMINA-TITANIUM CARBIDE-SILICON CARBIDE COMPOSITION

[75] Inventors: Pankaj K. Mehrotra, Greensburg, Pa.; Elizabeth R. Billman, Street, Md.

[73] Assignee: Kennametal Inc., Latrobe, Pa.

[21] Appl. No.: 361,451

[22] Filed: Jun. 5, 1989

[51] Int. Cl.$^5$ ............................................. C04B 35/10
[52] U.S. Cl. ...................................... 501/89; 501/95; 51/309
[58] Field of Search .......................... 501/95, 89, 127; 51/309

[56] References Cited

U.S. PATENT DOCUMENTS

| | | |
|---|---|---|
| 3,580,708 | 5/1971 | Ogawa et al. |
| 4,543,345 | 9/1985 | Wei. |
| 4,657,877 | 4/1987 | Becher et al. |
| 4,745,091 | 5/1988 | Landingham. |
| 4,770,673 | 9/1988 | Ketcham et al. |
| 4,789,277 | 12/1988 | Rhodes et al. ........................ 501/89 |
| 4,801,510 | 1/1989 | Mehrotra et al. |
| 4,820,663 | 4/1989 | Mehrotra et al. |
| 4,849,381 | 7/1989 | Branot et al. ........................ 501/89 |
| 4,852,999 | 8/1989 | Mehrotra et al. ..................... 51/309 |
| 4,867,761 | 9/1989 | Brandt et al. ........................ 501/87 |

FOREIGN PATENT DOCUMENTS 0202504 11/1986 European Pat. Off.
0252046 7/1988 European Pat. Off.
0089471 4/1988 Japan.
86/05480 9/1986 PCT Int'l Appl.

OTHER PUBLICATIONS

Buljan et al., "Ceramic Whisker—and Particulate-Composites: Properties, Reliability and Applications", Ceramic Bulletin, vol. 68, No. 2 (1989), pp. 387–394.
Faber and Evans, "Crack Deflection Processes—I. Theory", Acta Metall., vol. 31, No. 4, pp. 565–576 (1983).

Primary Examiner—William R. Dixon, Jr.
Assistant Examiner—Melissa Bonner
Attorney, Agent, or Firm—John Prizzi

[57] ABSTRACT

A ceramic composition is provided having a alumina based matrix with silicon carbide whiskers and titanium carbide phase dispersed therein. The composition includes about 1.0 to less than 30 volume percent silicon carbide whiskers, about 5 to about 40 volume percent titanium carbide phase. The sum of the volume percents of silicon carbide whiskers and titanium carbide phase is less than about 60 volume percent.

34 Claims, 5 Drawing Sheets

ALUMINA-TITANIUM CARBIDE-SILICON CARBIDE COMPOSITION

BACKGROUND OF THE INVENTION

The present invention relates to ceramic materials containing alumina, titanium carbide and silicon carbide and especially those compositions possessing a combination of high toughness and wear resistance.

Materials for cutting tool inserts fall into several well-known categories. These include high speed steels, cast alloys of cobalt and chromium, sintered carbides and ceramic materials such as alumina with the corundum crystal structure, and even diamonds. Each material has an advantage depending upon the particular application. Some are much more expensive than others. High speed steel has the greatest resistance to shock of all the materials. For this and other reasons, it is the preferred cutting material for many applications. Because of their resistance to wear, cast alloys and sintered carbides often cost less per piece machined than the steels.

Ceramic materials are used in especially difficult applications. They have high hardness, chemical inertness and wear resistance even at elevated temperatures. This makes them useful, for example, for cutting cast iron and hardened steel at high cutting speeds. The inertness prevents welding of the tool insert to the metal being machined at the temperatures created by machining. Generally, however, ceramic tool inserts cannot be used where there are heavy interrupted cuts. Also, at slower machining speeds, tool loads are markedly higher and ceramic tools are likely to chip or fracture because of their lower tensile strength and toughness.

Tougher ceramic tools have been developed. These may comprise the addition of a second ceramic phase. Each phase is comprised of equiaxed grains as a result of combining equiaxed powders prior to hot pressing to form the tool insert. The addition of a second equiaxed phase increases toughness to some extent and provides a wear resistant tool insert.

Ceramic cutting tools made of alumina-titanium carbide composites have been successful in machining ferrous and non-ferrous alloys. See, for example, U.S. Pat. No. 3,580,708. These ceramic composites possess excellent high temperature mechanical strength and chemical wear resistance which are needed for superior performance in metalcutting. The utility of the material may be limited by its low fracture toughness in applications where tools tend to fail by fracture, say, in milling or high speed roughing.

Toughness of equiaxed ceramic composites is known to increase with increasing volume of the second phase up to a maximum that depends upon the particular phases and generally reaching maximum between 30 and 40 volume percent of the second phase. Fracture toughness of ceramic composites may be further increased by altering the morphology or shape of the second phase. It has been shown by Faber and Evans, in "Crack Deflection Processes - I. Theory," *Acta Metall.*, Volume 31, No. 4, Pages 565-576 (1983) that the fracture toughness of certain ceramic composites can be increased by as much as four times by using rod-shaped second phases. The shape of the second phase is characterized by its aspect ratio (length to diameter ratio).

A composition disclosed in Wei U.S. Pat. No. 4,543,345 comprises the addition of silicon carbide whiskers to an alumina matrix to increase fracture toughness. It is explained in the Wei patent that the improved fracture toughness and resistance to slow crack growth is the result of energy spent in pulling whiskers out of the matrix. It is also pointed out in the Wei patent that not all matrix compositions are toughened by the addition of silicon carbide whiskers. Selected compositions disclosed in the Wei patent are finding use as materials for tool inserts. The tool inserts made with silicon carbide whiskers have limited use. They are useful for machining Inconel and other nickel base superalloys but have poor service life with soft steel or cast iron due to their poor wear resistance in these applications caused by their reactivity with iron at the high temperatures encountered.

SUMMARY OF THE INVENTION

It has been surprisingly found that the fracture toughness of fired ceramic compositions containing silicon carbide whiskers dispersed in an alumina based matrix phase can be substantially increased through the addition of dispersed titanium carbide phase to the alumina based matrix without a significantly adverse effect on the hardness of the composition. In addition, it has also been surprisingly found that, in the machining of soft steels, the wear resistance of silicon carbide whisker reinforced ceramic cutting tools can be increased by the addition of titanium carbide phase. In this manner, a ceramic cutting tool is provided which has the fracture toughness of silicon carbide whisker reinforced composites but with significantly improved wear resistance in soft steel machining applications.

In accordance with the present invention, a fired ceramic composition is provided having an alumina based matrix phase containing a dispersion of silicon carbide whiskers and titanium carbide phase. The ceramic composition contains about 1.0 to less than 30 v/o (volume percent), preferably 2.5 to 25 v/o, and more preferably 2.5 to 20 v/o silicon carbide whiskers, about 5 to about 40 v/o titanium carbide phase, and preferably up to about 3 v/o sintering aid residue, with the remainder essentially an alumina based matrix. The sum of the silicon carbide whisker and titanium carbide is preferably less than about 60 v/o, and more preferably less than about 50 v/o. The titanium carbide phase may be either substantially equiaxed titanium carbide particles, titanium carbide whiskers or a mixture thereof.

Where equiaxed titanium carbide particles are utilized, the particles have an average size of between 0.1 to 10 micrometers, preferably, 1 to 10 microns, and more preferably, 3 to 7 microns. Where titanium carbide whiskers are used, the whiskers have a diameter between 0.25 to 10 microns, and preferably about 1 to 10 microns. Preferably, the composition is comprised of about 10 to about 35 v/o titanium carbide phase, and more preferably, about 15 to 35 v/o titanium carbide phase. Preferably, the titanium carbide content is at least equal to the silicon carbide content and, more preferably, the titanium carbide content is greater than the silicon carbide content.

The alumina based (i.e., greater than 50 volume percent of the alumina based matrix is $Al_2O_3$) matrix is preferably entirely alumina except for impurities and sintering aid residue.

The sintering aid utilized in the present invention may preferably be zirconia, magnesia, a rare earth oxide such as yttria, or a combination of the foregoing not exceeding about 3 v/o. The sintering aid residue observed in the hot pressed composition is preferably between about 0.05 to 3.0 v/o and, more preferably, between 0.25 to 1.5 v/o. The sintering aid is preferably magnesia since this is believed to provide improved toughness.

BRIEF DESCRIPTION OF THE DRAWINGS

Further features and other objects and advantages will become apparent from the following detailed description of the invention made with reference to the drawings in which.

DETAILED DESCRIPTION OF THE INVENTION

The present invention will be further clarified by consideration of the following examples which are intended to be purely exemplary of the present invention.

Figure 1:
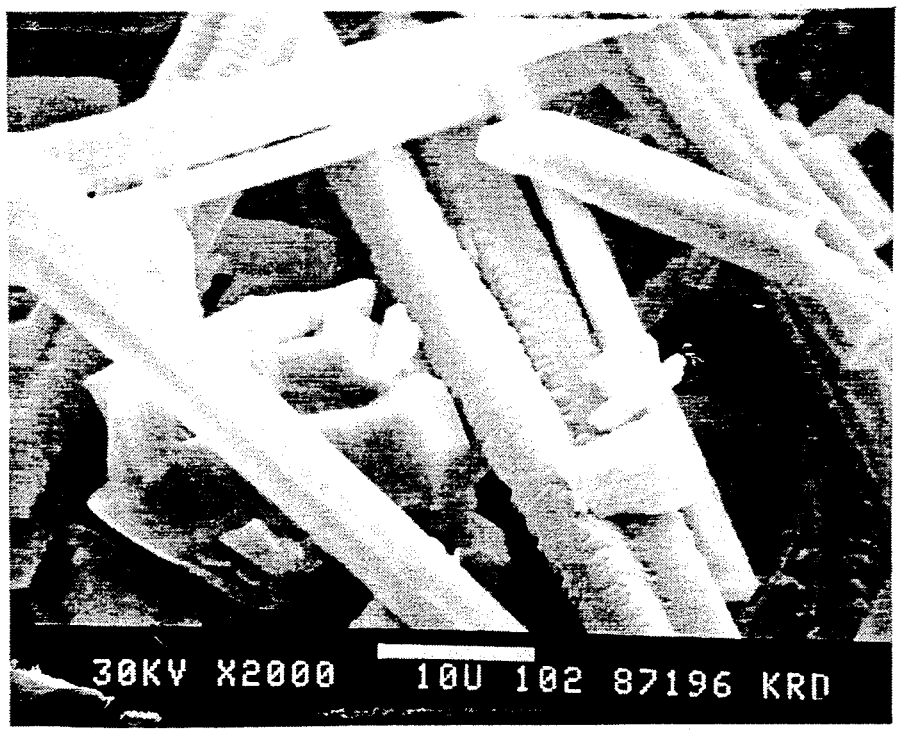
FIG. 1 is a scanning electron photomicrograph of large diameter, angular cross section titanium carbide whiskers (2000 ×).
Figure 2:
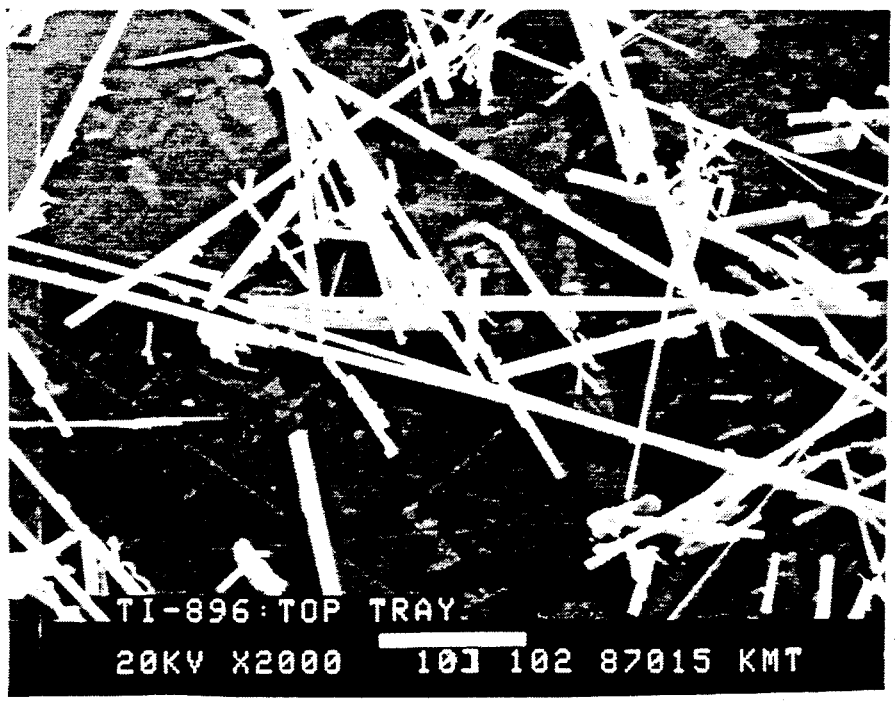
FIG. 2 is a scanning electron photomicrograph of small diameter, round cross section titanium carbide whiskers (2000 ×).
Figure 3:
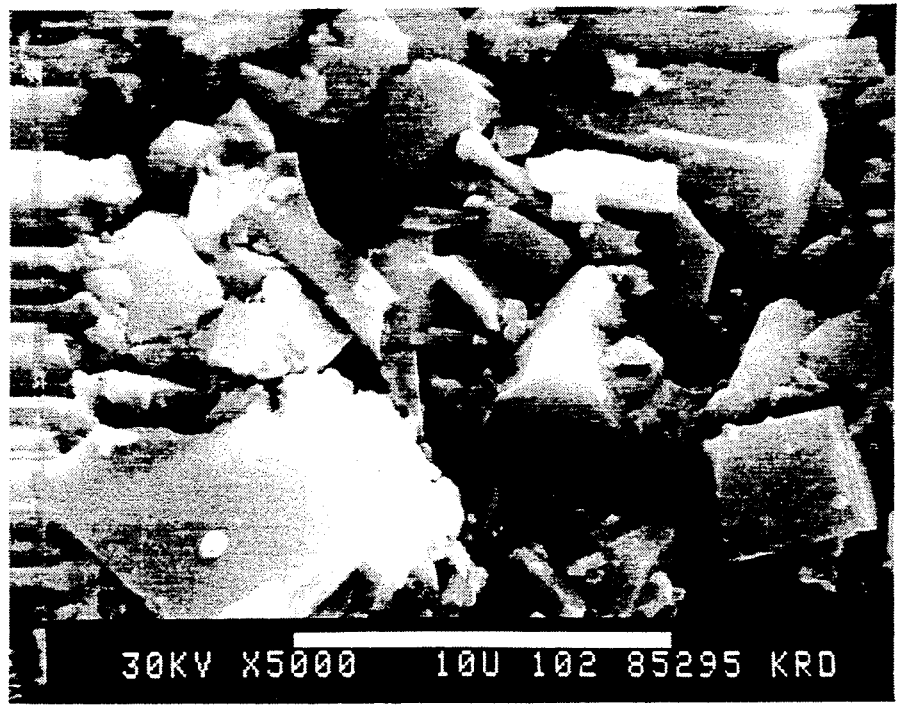
FIG. 3 is a scanning electron photomicrograph of equiaxed titanium carbide particles (5000 ×).

Mixes A through I as shown in Table I were made utilizing the following starting materials. Large diameter titanium carbide whisker starting material was composed of particles having an angular cross section with diameters between about 1 to about 6 microns and lengths up to about 100 microns (see FIG. 1). Small diameter titanium carbide whisker starting material was composed of particles having a round cross section and a diameter in the range of about 0.25 to about 3.0 microns and lengths up to about 150 microns (see FIG. 2). The substantially equiaxed titanium carbide particles had a diameter in the range of about 1 to about 10 microns with an average size of about 5 microns (see FIG. 3). These titanium carbide starting materials were at least 98 percent pure.

The titanium carbide whiskers were prepared in a chemical vapor deposition reactor using the technique described in Bauer et al U.S. patent application Ser. No. 354,641, filed on May 19, 1989, (Kennametal Inc. Case No. K-0963), but without the cleaning step utilized therein.

Figure 4:
FIG. 4 is a scanning electron photomicrograph of silicon carbide whiskers (2000 ×).

The silicon carbide whisker starting material had a diameter of about 0.3 to 0.7 microns, and a length of about 20 to 50 microns (see FIG. 4). The silicon carbide whiskers were purchased from Tokai Carbon Co. (>98 percent pure, grade No. 2; however, higher purity grade No. 1 may also be used).

The alumina (>99 percent pure, ALCOA A16-SG) had a median particle size after milling of about 0.5 to 0.6 microns.

The magnesia starting material had an average particle size of about 1.0 micron.

The foregoing particulate materials were measured out in the proportions required to produce about 60 grams of each of the nominal compositions (A through I) shown in Table I. Each mix was prepared by first ultrasonically dispersing the titanium carbide whiskers, silicon carbide whiskers and/or substantially equiaxed titanium carbide particles in propanol for about 20 minutes. Weighed amounts of alumina, dispersed titanium carbide whiskers and silicon carbide whiskers, and magnesia sintering aid were thoroughly, but gently, blended in a ball mill for about 30 minutes using propanol as the solvent and alumina cycloids as the media. The mixed slurry was pan dried, and passed through a 100 mesh screen. Each mix was then hot pressed in a one inch diameter graphite die using a pressure of about 4,000 psi under argon of one atmosphere at the approximate temperature shown in Table I to produce fired billets having a density of at least 98 percent of theoretical density.

Figure 5:
FIG. 5 is an optical photomicrograph of a ceramic composition containing silicon carbide whiskers, equiaxed titanium carbide phase and alumina (as polished, 625 ×).
Figure 6:
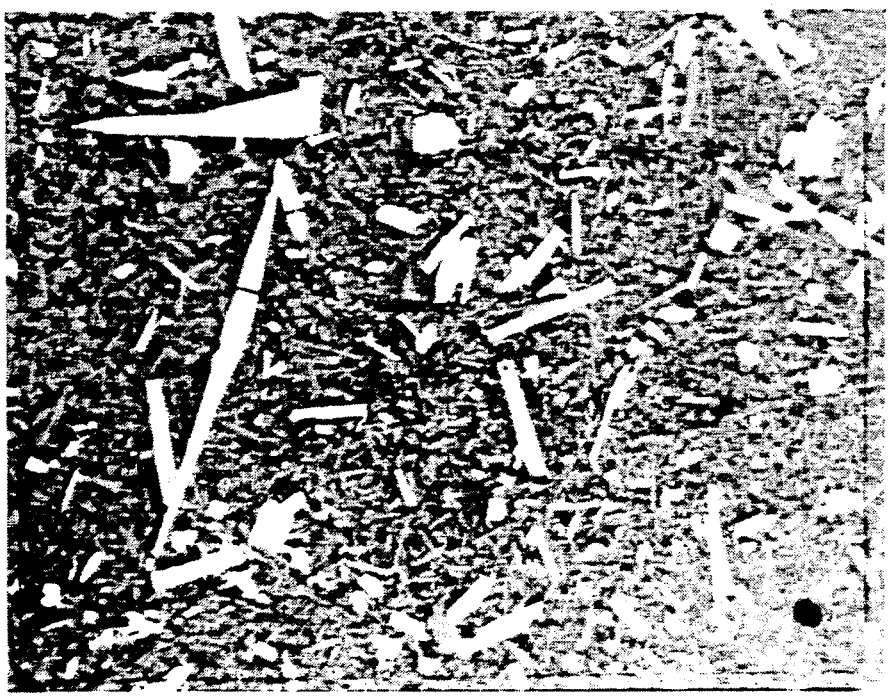
FIG. 6 is an optical photomicrograph of another ceramic composition containing silicon carbide whiskers, titanium carbide whiskers and alumina (as polished, 625 ×).

Typical cross sections through resulting compositions are shown in FIGS. 5 and 6. In FIG. 5, the large white phase is substantially equiaxed titanium carbide particles, the acicular light gray phase is silicon carbide whiskers and the dark gray matrix in which the foregoing phases are substantially homogeneous dispersed is alumina containing the residue (not visible at this magnification) of the magnesia sintering aid. FIG. 6 is similar to FIG. 5 except that this composition contains large diameter titanium carbide whiskers (white phase) instead of equiaxed titanium carbide particles.

Figure 7:
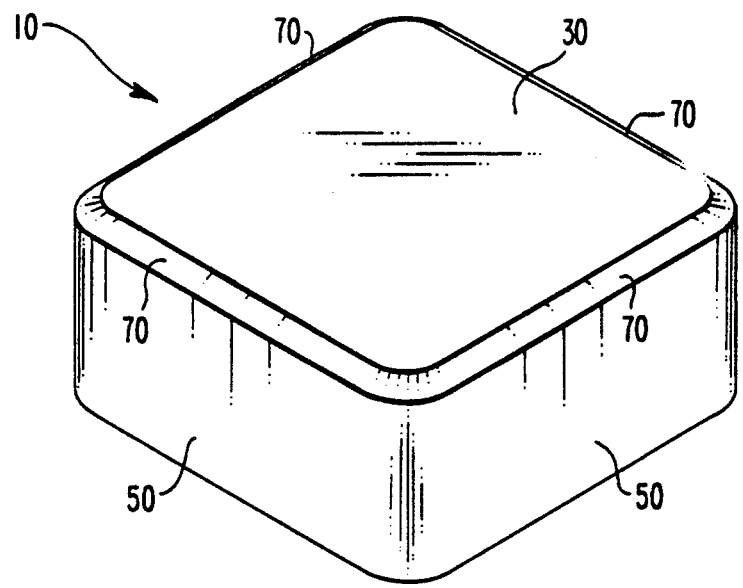
FIG. 7 shows an embodiment of an indexable cutting tool in accordance with the present invention.

The foregoing billets were then sectioned and ground into SNGN-433T style (American National Standard Designation in accordance with ANSI B212.4—1986 (cutting edge preparation: 0.008 inch × 20° chamfer)) indexable cutting inserts. An example of such a cutting insert 10 is shown in FIG. 7. The cutting insert 10 has a rake face 30, a flank face 50 and a cutting edge 70 at the junction of the rake and flank faces. The cutting edge 70 is preferably in a chamfered condition as mentioned above and shown in FIG. 7.

These materials were then subjected to hardness testing (Rockwell A), fracture toughness testing by the Palmqvist method (Evans and Charles, Fracture Toughness Determination by Indentation," J. American Ceramic Society, Vol. 59, No. 7-8, pages 371, 372, using an 18.5 kg load) and cutting tests the results of which are described in Tables I and II and plotted in FIGS. 8 and 9.

TABLE I

| Mix No. | v/o TiC | v/o $SiC_w$ | v/o Sintering Aid | $Al_2O_3$ | RA Hardness | Fracture Toughness $K_{IC}$ (E & C) | Density (g/cc) | % Theoretical Density | Hot Pressing Temperature °C. |
|---------|---------|-------------|-------------------|-----------|-------------|-------------------------------------|----------------|-----------------------|------------------------------|
| A | 15 WS | 15 | 1 MgO | Rem | 93.5 | 5.67 | 3.95 | 99 | 1600 |

TABLE I-continued

| Mix No. | v/o TiC | v/o SiC$_w$ | v/o Sintering Aid | Al$_2$O$_3$ | RA Hardness | Fracture Toughness K$_{IC}$ (E & C) | Density (g/cc) | % Theoretical Density | Hot Pressing Temperature °C |
|---|---|---|---|---|---|---|---|---|---|
| B | 30 WS | 15 | 1 MgO | Rem | 94.0 | 5.85 | 4.12 | 100 | 1600 |
| C | 15 E | 15 | 1 MgO | Rem | 93.9 | 5.67 | 3.97 | 99 | 1600 |
| D | 30 E | 15 | 1 MgO | Rem | 94.0 | 5.98 | 4.12 | 100 | 1600 |
| E | 15 WL | 15 | 1 MgO | Rem | 93.9 | 5.80 | 3.96 | 99 | 1600 |
| F | 30 WL | 15 | 1 MgO | Rem | 93.8 | 6.25 | 4.09 | 99 | 1600 |
| G | 15 WS | 30 | 1 MgO | Rem | 94.2 | 5.72 | 3.81 | 98 | 1700 |
| H | 15 E | 30 | 1 MgO | Rem | 94.2 | 5.99 | 3.87 | 99 | 1650 |
| I | 15 WL | 30 | 1 MgO | Rem | 94.6 | 6.26 | 3.86 | 99 | 1700 |
| K | 30 E | 0 | 1 ZrO$_2$ | Rem | 92.3 | 5.72 | 4.24 | 99 | 1500 |
| L | 30 E | 0 | 1 ZrO$_2$ | Rem | 92.2 | 5.00 | 4.27 | 100 | 1550 |
| M | 30 WS | 0 | 1 ZrO$_2$ | Rem | 94.0 | 5.79 | 4.25 | 99 | 1500 |
| N | 30 WS | 0 | 1 ZrO$_2$ | Rem | 94.1 | 6.44 | 4.25 | 99 | 1550 |
| O | 0 | 15 | 0 | Rem | 94.2 | 5.32 | 3.80 | 99 | 1750 |
| P | 0 | 20 | 0 | Rem | 94.3 | 6.14 | 3.78 | 99 | 1750 |
| Q | 0 | 30 | 0 | Rem | 94.6 | 6.36 | 3.72 | 99 | 1750 |
| K090 | 27 to 28 E | 0 | 1 MgO | Rem | 94.4 | 4.41 | 4.29 | — | — |

WS = small diameter TiC whiskers
WL = large diameter TiC whiskers
E = substantially equiaxed TiC particles

TABLE II

TURNING AISI 1045 STEEL

| Mix No. | Average Cutting Edge Lifetime & Failure Mode (minutes) | | Flank Wear Resistance Minutes/Inch |
|---|---|---|---|
| A | 2.1 | BK | 625 |
| B | 1.5 | BK | 435 |
| C | 2.3 | BK | 714 |
| D | 3.4 | BK | 526 |
| E | 1.8 | BK | 714 |
| F | 5.3 | BK | 667 |
| G | 0.5 | CR | 57 |
| H | 1.1 | DN,BK | 99 |
| I | 2.0 | DN,CH | 154 |
| O | 5.8 | DN,CH | 500 |
| P | 2.25 | DN,BK | 323 |
| Q | 1.0 | CR,BK | 159 |
| K090 | 1.3 | BK,CR | 909 |

Cutting Conditions:
Workpiece Material: AISI 1045 (180–195 BHN)
Insert Style: SNGN-433T
Lead Angle: 15°
Speed: 1000 surface feet/minute
Feed: 0.024 inches/revolution
Depth of Cut: 0.100 inch
Comparative tests O, P and Q were performed under similar conditions described in Table II of U.S. Pat. No. 4,801,510 using the similar style insert used therein: SNGN-453T.
Cutting Edge Life Criteria:
    FW-.015" uniform flank wear
    CR-.004" crater wear
    DN-.030" depth of cut notch
    CH-.030" concentrated wear or chipping
    BR-breakage $$\text{Flank Wear Resistance} = \frac{1}{\text{Flank Wear Rate}}$$

where $$\text{Flank Wear Rate} = \frac{\text{Measued Flank Wear at End of Life}}{\text{Lifetime}}$$

Figure 9:
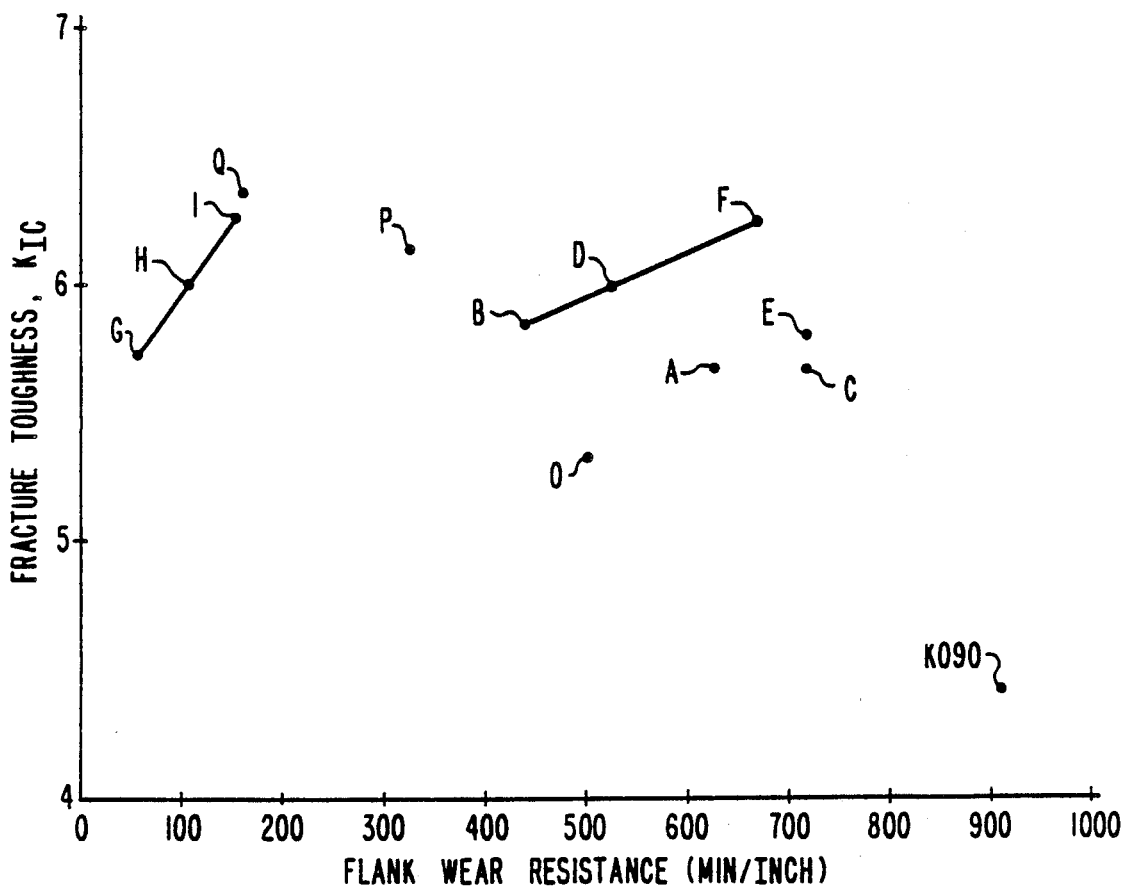
FIG. 9 shows a plot of fracture toughness, $K_{IC}$, versus flank wear resistance of compositions in the high speed rough turning of AISI 1045 steel.
Figure 8:
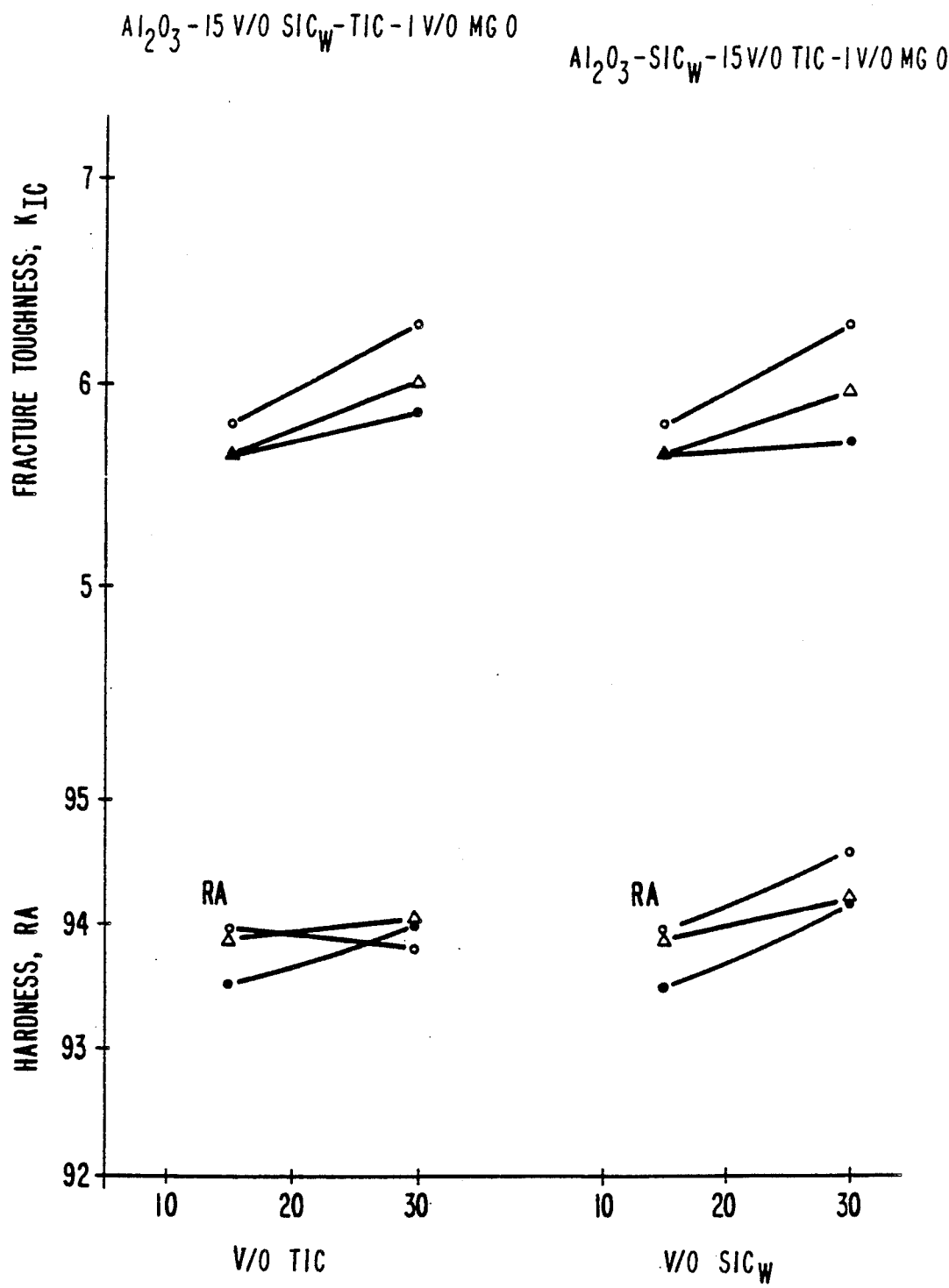
FIG. 8 shows plots of Rockwell A hardness and fracture toughness, $K_{IC}$, in MPam$^{\frac{1}{2}}$ (18.5 kg load), as functions of titanium carbide content and silicon carbide whisker ($SiC_w$) content, where . = small diameter titanium carbide whiskers; o = large diameter titanium carbide whiskers; and $\Delta$ = substantially equiaxed titanium carbide particles.

As shown in Tables I and II and FIGS. 8 and 9, increasing additions of titanium carbide to alumina-silicon carbide whisker compositions containing less than 30 v/o silicon carbide whiskers results in an increase in fracture toughness. At a concentration of 30 v/o silicon carbide whisker (Mix Q), the data indicate that the addition of titanium carbide phase (Mixes G, H and I) results in an adverse effect on both the fracture toughness and flank wear resistance of the material compared with the material without titanium carbide. At silicon carbide whisker contents below 30 v/o, the addition of titanium carbide results in increased fracture toughness and generally results in increased flank wear resistance (see A, C, E, D and F). The data surprisingly indicate that the addition of titanium carbide as substantially equiaxed particles (D and C) or as whiskers with a diameter in the range of 1 to 6 microns (E and F) provides a higher fracture toughness and flank wear resistance than the addition of titanium carbide whiskers with a diameter in the range of 0.25 to 3 microns (A and B).

Review of these test results lead us to believe that, to obtain optimum combinations of flank wear resistance in cutting soft steel and fracture toughness, the titanium carbide phase content of the material preferably should, at least, be equal to the silicon carbide content, and most preferably, greater than the silicon carbide content. In addition, it is our belief that, for optimum toughness and wear resistance, the average titanium carbide whisker diameter should preferably be between about 1 to 10 $\mu$ and, more preferably, should be greater than the average silicon carbide whisker diameter.

It can clearly be seen that the present invention provides a range of compositions containing a combination of K$_{IC}$ fracture toughness exceeding 5.5 MPam$^{\frac{1}{2}}$, and more preferably, exceeding about 6 MPam$^{\frac{1}{2}}$, in conjunction with high flank wear resistance in the high speed roughing of soft steels such as AISI 1045 steel. Preferably, these cutting tools in accordance with the present invention are characterized by a flank wear resistance of greater than 400, more preferably greater than 500, and most preferably greater than 650 minutes/inch when turning AISI 1045 steel having a hardness of 180–195 BHN at a speed of 1000 surface feet/minute (sfm), a feed rate of 0.024 inch/revolution (ipr) and a depth of cut (doc) of 0.100 inch.

These compositions in accordance with the present invention also provide cutting tools having improved thermal shock resistance compared with similar compositions containing titanium carbide without silicon carbide. Silicon carbide increases the hardness and the thermal conductivity, and decreases the thermal expansivity, of these materials. The combination of the improvements in thermal conductivity and expansivity in conjunction with high fracture toughness, provides the aforementioned improvement in thermal shock resistance.

The combination of properties possessed by the present invention—improved flank wear resistance in the high speed roughing of soft steels, fracture toughness and thermal shock resistance—cannot be found in the prior art alumina compositions containing only silicon carbide or titanium carbide as a reinforcing agent.

It is contemplated that the ceramic compositions in accordance with the present invention will be useful as cutting inserts with or without a coating. If coated, they may be coated with one or more refractory coatings such as alumina with or without titanium nitride as described in our U.S. Pat. No. 4,801,510.

It is further believed that the manufacturing cost of the present invention may be reduced if the hot pressing step utilized herein to at least substantially fully densify the substrate is replaced by the densification method described in P. K. Mehrotra et al copending U.S. Pat. No. 4,820,663, the whisker containing ceramic substrate is sintered to substantially full density by a method including the steps of: (a) forming a compact of a sinterable ceramic composition; (b) applying a coating to the compact by vapor deposition of a ceramic composition that does not become vitreous before or during the subsequent isostatic pressing step; and (c) heating and isostatically pressing the coated compacts in an atmosphere that reacts with the coating and/or the compact at pressing temperatures and pressures to cause the compact to approach theoretical density. U.S. Pat. No. 4,820,663 and all other patents, patent applications and publications referred to herein are hereby incorporated by reference.

Other embodiments of the invention will be apparent to those skilled in the art from a consideration of this specification or practice of the invention disclosed herein.

For example, it should be recognized that one skilled in the art can develop optimized compositions within the scope of the invention for machining carbon steel or other materials, perhaps using machining conditions differing from those used herein.

It is intended that the specification and examples be considered as exemplary only, with the true scope and spirit of the invention being indicated by the following claims:

What is claimed is:

1. A fired ceramic composition comprising:
    about 1.0 to less than 30 volume percent silicon carbide whiskers having an average diameter between about 0.3 and about 0.7 microns;
    about 5 to about 40 volume percent titanium carbide phase selected from the group consisting of substantially equiaxed titanium carbide particles having an average diameter between 1 and 10 microns, titanium carbide whiskers having an average diameter of between about 1 to about 10 microns, and mixtures thereof;
    wherein the sum of said silicon carbide whiskers and said titanium carbide phase is less than about 60 volume percent;
    an alumina based matrix forming essentially the remainder;
    and wherein said silicon carbide whiskers and said titanium carbide phase are dispersed in said alumina based matrix.

2. The fired ceramic composition according to claim 2 wherein said titanium carbide phase consists of said titanium carbide whiskers.

3. The fired ceramic composition according to claim 1 further comprising up to about 3 volume percent of a sintering aid residue.

4. The fired ceramic composition according to claim 1 wherein said titanium carbide phase forms about 10 to about 35 volume percent of said fired ceramic composition.

5. The fired ceramic composition according to claim 1 wherein said silicon carbide whiskers form about 2.5 to about 25 volume percent of said fired ceramic composition.

6. The fired ceramic composition according to claim 1 containing 15 to 35 volume percent of said titanium carbide whiskers.

7. The fired ceramic composition according to claim 1 containing 2.5 to 20 volume percent silicon carbide whiskers.

8. The fired ceramic composition according to claim 1 containing 2.5 to 20 volume percent silicon carbide whiskers.

9. A cutting tool comprising:
    a ceramic body having a flank face, a rake face and a cutting edge formed at a juncture of said rake face and said flank face;
    said ceramic body composed of about 1.0 to less than 30 volume percent silicon carbide whiskers having an average diameter between about 0.3 and about 0.7 microns;
    about 5 to about 40 volume percent titanium carbide phase;
    wherein the sum of titanium carbide phase plus silicon carbide whiskers is less than 60 volume percent;
    an alumina based matrix forming essentially the remainder; and
    wherein said silicon carbide whisker and said titanium carbide phase are dispersed in said alumina based matrix and said titanium carbide phase has a larger average diameter than the average diameter of the silicon carbide whiskers.

10. The cutting tool according to claim 9 wherein said titanium carbide phase is titanium carbide whiskers having an average diameter of about 1 to 10 microns.

11. The cutting tool according to claim 9 characterized by a $K_{IC}$(E&C) fracture toughness of greater than 5.5 MPam$^{\frac{1}{2}}$ and a flank wear resistance of greater than 400 minutes/inch when turning AISI 1045 steel having a hardness of 180–195 BHN at a speed of 1000 surface feet/minute, a feed rate of 0.024 inch/revolution and a depth of cut of 0.100 inch.

12. The cutting tool according to claim 11 wherein said flank wear resistance is greater than 500 minutes/inch.

13. The cutting tool according to claim 11 wherein said wear resistance is greater than 650 minutes/inch.

14. The cutting tool according to claim 9 containing about 2.5 to 25 volume percent silicon carbide whiskers.

15. The cutting tool according to claim 9 containing about 2.5 to 20 volume percent silicon carbide whiskers.

16. The cutting tool according to claim 14 containing 10 to 35 volume percent titanium carbide whiskers having an average diameter between 1 and 10 microns.

17. The cutting tool according to claim 15 containing 15 to 35 volume percent titanium carbide whiskers having an average diameter between 1 and 10 microns.

18. The cutting tool according to claim 9 wherein the volume percent of titanium carbide phase is at least equal to the volume percent silicon carbide whiskers.

19. The cutting tool according to claim 9 wherein the volume percent of titanium carbide phase is greater than the volume percent of silicon carbide whiskers.

20. A fired ceramic composition comprising:
about 1.0 to less than 30 volume percent silicon carbide whiskers;
about 5 to about 40 volume percent of substantially equiaxed titanium carbide particles having an average diameter between 1 and 10 microns;
wherein the sum of said silicon carbide whiskers and said substantially equiaxed titanium carbide particles is less than about 60 volume percent;
an alumina based matrix forming essentially the remainder;
wherein the average diameter of said substantially equiaxed titanium carbide particles is greater than the average diameter of the silicon carbide whiskers;
and wherein said silicon carbide whiskers and said substantially equiaxed titanium carbide particles are dispersed in said alumina based matrix.

21. The fired ceramic composition according to claim 20 wherein said substantially equiaxed titanium carbide particles have an average diameter between 3 and 7 microns.

22. A fired ceramic composition comprising:
about 1.0 to less than 30 volume percent silicon carbide whiskers having an average diameter between about 0.3 and about 0.7 microns;
about 5 to about 40 volume percent of substantially equiaxed titanium carbide particles having an average diameter between 1 and 10 microns;
wherein the sum of said silicon carbide whiskers and said substantially equiaxed titanium carbide particles is less than about 60 volume percent;
an alumina based matrix forming essentially the remainder;
and wherein said silicon carbide whiskers and said substantially equiaxed titanium carbide particles are dispersed in said alumina based matrix.

23. A cutting tool comprising:
a ceramic body having a flank face, a rake face and a cutting edge formed at a juncture of said rake face and said flank face;
said ceramic body composed of about 1.0 to less than 30 volume percent silicon carbide whiskers;
about 5 to about 40 volume percent of substantially equiaxed titanium carbide particles having an average diameter of about 1 to 10 microns;
wherein the sum of titanium carbide particles plus said silicon carbide whiskers is less than 60 volume percent;
an alumina based matrix forming essentially the remainder; and
wherein said silicon carbide whisker and said titanium carbide phase are dispersed in said alumina based matrix and said titanium carbide phase has a larger diameter than the average diameter of the silicon carbide whiskers.

24. The fired ceramic composition according to claim 20 wherein said substantially equiaxed titanium carbide particles form about 10 to about 35 volume percent of said fired ceramic composition.

25. The fired ceramic composition according to claim 20 wherein said silicon carbide whiskers form about 2.5 to about 25 volume percent of said fired ceramic composition.

26. The fired ceramic composition according to claim 20 containing 2.5 to 20 volume percent silicon carbide whiskers.

27. The fired ceramic composition according to claim 24 containing 2.5 to 20 volume percent silicon carbide whiskers.

28. The cutting tool according to claim 23 characterized by a $K_{IC}$(E&C) fracture toughness of greater than 5.5 MPam$^{\frac{1}{2}}$ and a flank wear resistance of greater than 400 minutes/inch when turning AISI 1045 steel having a hardness of 180–195 BHN at a speed of 1000 surface feet/minute, a feed rate of 0.024 inch/revolution and a depth of cut of 0.100 inch.

29. The cutting tool according to claim 25 wherein said flank wear resistance is greater than 500 minutes/inch.

30. The cutting tool according to claim 28 wherein said wear resistance is greater than 650 minutes/inch.

31. The cutting tool according to claim 22 containing about 2.5 to 25 volume percent silicon carbide whiskers.

32. The cutting tool according to claim 23 containing about 2.5 to 20 volume percent silicon carbide whiskers.

33. The cutting tool according to claim 23 wherein the volume percent of said substantially equiaxed titanium carbide particles is at least equal to the volume percent silicon carbide whiskers.

34. The cutting tool according to claim 23 wherein the volume percent of said substantially equiaxed titanium carbide particles is greater than the volume percent of silicon carbide whiskers.

* * * * *